O. HERRMANN.
EDUCATIONAL DEVICE FOR OBJECTIVE TEACHING.
APPLICATION FILED JAN. 3, 1920.
1,343,721.
Patented June 15, 1920.
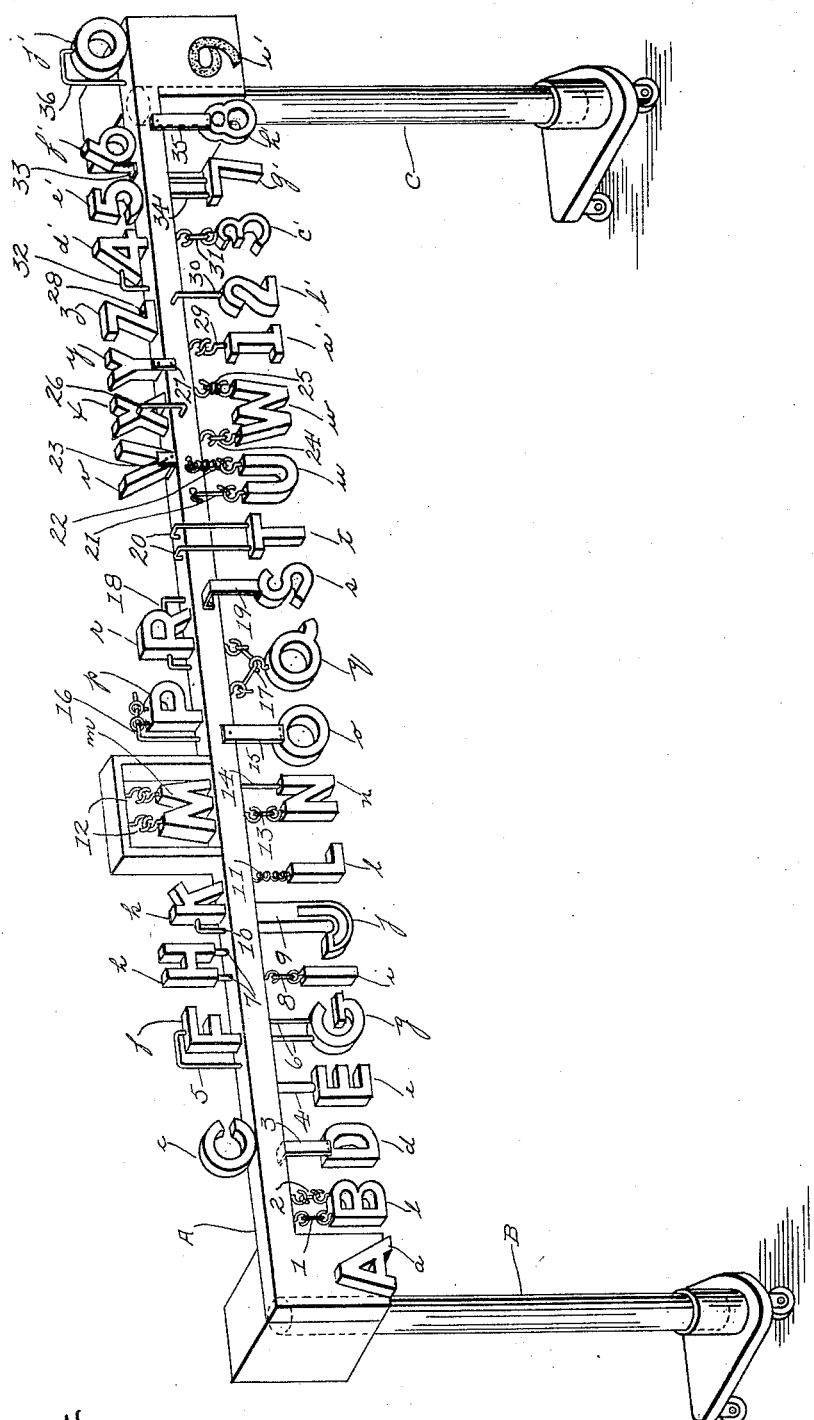
Oscar Herrmann
INVENTOR
BY
Samuel H. Wandell
ATTORNEY

UNITED STATES PATENT OFFICE.

OSCAR HERRMANN, OF NEW YORK, N. Y.

EDUCATIONAL DEVICE FOR OBJECTIVE TEACHING.

1,343,721.    Specification of Letters Patent.    Patented June 15, 1920.

Application filed January 3, 1920. Serial No. 349,290.

*To all whom it may concern:*

Be it known that I, OSCAR HERRMANN, a citizen of the United States, and a resident of the borough of Manhattan, city, county, and State of New York, have invented certain new and useful Improvements in Educational Devices for Objective Teaching, of which the following is a specification.

My invention relates to improvements in educational devices especially suitable for imparting instruction in kindergarten schools and is particularly adapted for teaching the letters of the alphabet and the common numerals to children and to adult foreigners and for other purposes hereinafter described.

The figure in the drawing is a perspective view of a preferred type of my invention.

One of the objects of my invention is to provide a supporting member upon which the several letters of the alphabet and the various numerals may be mounted, the characters being affixed thereon by independent and distinctive means so that such characters may be easily identified and distinguished by the manner in which the same are secured to the supporting member.

The advantage to be secured by the use of my invention in imparting instruction is that the letters and numerals being attached independently by separate and distinguishing means are more readily memorized by the pupil.

For example, the pupil can more readily remember that the character $l$ attached to the horizontal bar A as shown in the drawing, being suspended therefrom by the coiled spring 11, is the letter "L" of the alphabet, and also that the character $f$ held by the wire arm 5, is the letter "F," than if the same characters were either pointed out upon a blackboard or shown upon a printed page. The different means of affixing the several letters and numerals to the horizontal bar A will, by association of ideas, practically aid the pupil in memorizing the names of the letters and figures. This invention will be of especial value in imparting instruction to idiots and incompetents.

The characters used may be cut or stamped out of wood, metal, card board, or any suitable substance, and may be affixed to or secured upon the supporting member in an infinite variety of ways, differing as much as may be desired. For example, some of the characters may be carved out of the material of the horizontal bar A or painted or rigidly fixed thereon; some may be attached by different arrangements of flexible connecting links such as wires, cords or chains so as to permit them to oscillate; some may be painted in different colors or made of different materials, such as brass, copper, tin, etc., in order to distinguish one from another, the object being to impart individuality to the different characters so that the same may be readily recognized and distinguished and more easily identified by a person unfamiliar with the names of the characters.

Referring to the drawings, A represents the supporting member upon which the characters are mounted. The horizontal bar A is here shown provided with legs B and C which are movable on casters. I do not, however, limit myself to any particular method of construction of the supporting member.

In the drawing, the letters of the alphabet are indicated by the small letters, $a$, $b$, $c$, $d$, etc., while the numerals are indicated by letters, $a'$, $b'$, $c'$, $d'$, etc. The means used for attaching or securing the characters to the supporting member A are indicated by the figures 1 to 36 inclusive.

The first letter of the alphabet "A" indicated by the small letter $a$ is shown rigidly affixed to the supporting member A at the extreme left of the drawing, being followed by the remaining characters in alphabetical order and then by the numerals in succession; the last numeral indicated by the small letter $i'$, representing the numeral 9, is shown at the extreme right of the drawing rigidly affixed to the supporting frame. The cipher "0" appears above this numeral on the upper right hand corner of the frame.

The remaining characters of the alphabet and the remaining numerals, for the purpose of illustration, are shown to be affixed to or secured upon the supporting member A by various and separate means.

Thus $b$, is shown suspended at the bottom of the supporting member A by screw hooks, chains and wires indicated by the numerals 1 and 2.

$c$ is screwed upon the top of the supporting member A.

*d* is hung from the bottom by a flat strip 3.

*e* is attached by a round peg 4.

*f* is held in place by the wire arm 5.

*g* is attached by the rods 6.

*h* is supported by the wires 7.

*i* is hung by the screw hook and cord 8.

*j* is carved out of the frame at 9.

*k* is fastened by the wire brace 10.

*l* is suspended by the coiled spring 11.

*m* is supported by the small frame and screw hooks 12.

*n* is suspended by the screw hook 13 and wire 14.

*o* is attached by the broad flat strip 15.

*p* is suspended on the wire brace and screw hooks 16.

*q* is attached by the screw hooks and bent wire 17.

*r* is held in place by the bent wires 18.

*s* is suspended on the bracket 19.

*t* is sustained by the two bent wires 20.

*u* is suspended from pegs by screw hook 21 and spring 22.

*v* is rigidly affixed by the cleat 23.

*w* is suspended by the screw hooks and links 24 and 25.

*x* is affixed by the bent wire 26.

*y* is affixed by the cleat 27.

*z* is rigidly affixed by a screw 28.

The numerals $a'-h'$ inclusive are likewise attached to the supporting member by various similar methods as shown in the drawing.

I do not, however, confine or limit myself to any particular manner or method of attaching or securing the characters to the supporting member or to any particular manner or method of construction or arrangement or to any particular means of distinguishing one character from another or of identifying any particular character.

The characters may also be made distinguishable by or in classes or groups as well as individually.

It is to be distinctly understood that the precise construction shown in the drawing is for the purpose of illustration and of affording a clear understanding of my invention only, and that my invention is not limited thereto, but that departures therefrom and modifications and variations therein may be made and resorted to within the scope of my claims, and without departing from my invention or sacrificing any of the advantages or principles thereof.

The individual taste and judgment of the person constructing my invention for practical use may be relied upon to secure a useful arrangement and combination of characters, and satisfactory means of distinguishing and identifying the several characters.

My invention may be adapted and arranged for use in teaching the alphabet of any foreign language.

Having described my invention, what I claim and desire to secure by Letters Patent is:

1. An educational device consisting of a suitably sustained supporting horizontal bar, a plurality of disconnected letters suspended from said bar and arranged in alphabetical series lengthwise of said bar, and a plurality of separate connecting links, one linkage for each of a group of said characters, for suspending the characters from the bar, the connecting links being different in construction and distinctive from each other so as to more readily identify the characters by association of the individual character with the separate link by which it is suspended from the supporting bar.

2. An alphabetical device consisting of a suitably sustained supporting horizontal bar, a plurality of disconnected characters comprising letters and figures secured to said bar and arranged in alphabetical and numerical series, and a plurality of separate flexible connecting links, one linkage to each of some part of said characters, for pivotally securing a plurality of said characters to the said bar in such a manner as to permit them to oscillate, the connecting links being different in construction and distinctive from each other so as to more readily identify said characters by association of the individual character with the separate link by which it is suspended from the supporting bar.

3. An educational device consisting of a suitably sustained supporting horizontal bar, a group of characters comprising a plurality of disconnected letters of the alphabet connected to the top of the bar by a plurality of separate and distinctive links, and also another group of characters comprising a plurality of disconnected letters of such alphabet suspended from said bar by a plurality of separate and distinctive links, the letters of the said two groups being arranged in their alphabetical order lengthwise of said bar, the plurality of separate connecting links being provided in the ratio of one linkage to each of said characters of each group, said links being of different and varying construction, so as to more readily identify the characters by association of the individual character with the separate link by which it is sustained by or suspended from the supporting bar.

4. An educational device consisting of a supporting member suitably mounted or sustained, having attached thereto in alphabetical or numerical order, a series of detached oscillating letters or figures arranged lengthwise of the supporting member, and attached thereto by separate and distinctive means, in order to identify the characters more readily.

OSCAR HERRMANN.